US009274796B2

(12) United States Patent
Norden

(10) Patent No.: US 9,274,796 B2
(45) Date of Patent: Mar. 1, 2016

(54) VARIABLE REGISTER AND IMMEDIATE FIELD ENCODING IN AN INSTRUCTION SET ARCHITECTURE

(75) Inventor: Erik K. Norden, Munich (DE)

(73) Assignee: ARM FINANCE OVERSEAS LIMITED, Cambridge (GB)

( * ) Notice: Subject to any disclaimer, the term of this patent is extended or adjusted under 35 U.S.C. 154(b) by 1115 days.

(21) Appl. No.: 12/464,027

(22) Filed: May 11, 2009

(65) Prior Publication Data

US 2010/0287359 A1 Nov. 11, 2010

(51) Int. Cl.
G06F 7/38 (2006.01)
G06F 9/00 (2006.01)
G06F 9/44 (2006.01)
G06F 15/00 (2006.01)
G06F 9/30 (2006.01)

(52) U.S. Cl.
CPC .......... *G06F 9/30178* (2013.01); *G06F 9/3016* (2013.01); *G06F 9/30156* (2013.01); *G06F 9/30167* (2013.01); *G06F 9/30174* (2013.01); *G06F 9/30189* (2013.01)

(58) Field of Classification Search
None
See application file for complete search history.

(56) References Cited

U.S. PATENT DOCUMENTS

| 5,636,352 | A | 6/1997 | Bealkowski et al. | |
|---|---|---|---|---|
| 5,740,461 | A * | 4/1998 | Jaggar | 712/41 |
| 6,826,681 | B2 | 11/2004 | Kissell et al. | |
| 7,162,621 | B2 | 1/2007 | Kissell | |
| 7,281,123 | B2 | 10/2007 | Kissell et al. | |
| 7,617,388 | B2 | 11/2009 | Kissell | |
| 2003/0225998 | A1 * | 12/2003 | Khan et al. | 712/210 |
| 2005/0091474 | A1 * | 4/2005 | Wojewoda et al. | 712/209 |
| 2007/0186079 | A1 * | 8/2007 | Sih et al. | 712/210 |
| 2008/0028195 | A1 | 1/2008 | Kissell et al. | |
| 2009/0043990 | A1 | 2/2009 | Giri et al. | |

FOREIGN PATENT DOCUMENTS

WO    WO 01/69376 A2    9/2001

OTHER PUBLICATIONS

National Semiconductor—CompactRISC Core Architecture Overview, 4 pages, at URL: http://www.national.com/analog/compactrisc.architecture.

MIPS32 Architecture for Programmers vol. I: Introduction to the MIPS32 Architecture, Jul. 1, 2005, 87 pages, rev. 2.50, MIPS Technologies, Inc.

MIPS32 Architecture Reference Manual vol. II-b: microMIPS—Recoded Instruction Set (Preliminary), Dec. 2, 2008, 107 pages, revision 0.93.

(Continued)

*Primary Examiner* — Corey S Faherty

(74) *Attorney, Agent, or Firm* — Patterson Thuente Pedersen, P.A.

(57) ABSTRACT

A method and apparatus provide means for compressing instruction code size. An Instruction Set Architecture (ISA) encodes instructions compact, usual or extended bit lengths. Commonly used instructions are encoded having both compact and usual bit lengths, with compact or usual bit length instructions chosen based on power, performance or code size requirements. Instructions of the ISA can be used in both privileged and non-privileged operating modes of a microprocessor. The instruction encodings can be used interchangeably in software applications. Instructions from the ISA may be executed on any programmable device enabled for the ISA, including a single instruction set architecture processor or a multi-instruction set architecture processor.

70 Claims, 10 Drawing Sheets

(56) References Cited

OTHER PUBLICATIONS

MIPS32 Architecture for Programmers vol. III: The MIPS32 Privileged Resource Architecture, Jul. 1, 2005, 151 pages, rev. 2.50, MIPS Technologies, Inc.
MIPS32 Architecture for Programmers vol. IV-d: The SmartMIPS Application-Specific Extension to the MIPS32 Architecture, Jul. 1, 2005, 68 pages, rev. 2.50, MIPS Technologies, Inc.
MIPS32 Architecture for Programmers vol. IV-e: The MIPS DSP Application-Specific Extension to the MIPS32 Architecture, May 18, 2007, 233 pages, rev. 2.10, MIPS Technologies, Inc.
MIPS32 Architecture for Programmers vol. IV-f: The MIPS MT Application-Specific Extension to the MIPS32 Architecture, Sep. 28, 2005, 83 pages, rev. 1.00, MIPS Technologies, Inc.
MIPS64 Architecture for Programmers vol. I: Introduction to the MIPS64 Architecture, Jun. 8, 2003, 95 pages, rev. 2.00, MIPS Technologies, Inc.
MIPS64 Architecture for Programmers vol. II: The MIPS64 Instruction Set, Jun. 9, 2003, 406 pages, rev. 2.00, MIPS Technologies, Inc.
MIPS64 Architecture for Programmers vol. II: The MIPS64 Instruction Set, Jul. 1, 2005, 409 pages, rev. 2.50, MIPS Technologies, Inc.
MIPS64 Architecture Reference Manual vol. II-b: microMIPS—Recoded Instruction Set (Preliminary), Dec. 2, 2008, 125 pages, rev. 0.93.
MIPS64 Architecture for Programmers vol. III: The MIPS64 Privileged Resource Architecture, Jun. 9, 2003, 160 pages, rev. 2.00, MIPS Technologies, Inc.
MIPS64 Architecture for Programmers vol. III: The MIPS64 Privileged Resource Architecture, Jul. 1, 2005, 167 pages, rev. 2.50, MIPS Technologies, Inc.
MIPS64 Architecture for Programmers vol. IV-c: The MIPS-3D™ Application-Specific Extension to the MIPS64 Architecture; Aug. 29, 2002, 57 pages, rev. 1.12, MIPS Technologies, Inc.

\* cited by examiner

| Encoded Hex Input | 0 | 1 | 2 | 3 | 4 | 5 | 6 | 7 |
|---|---|---|---|---|---|---|---|---|
| Decoded Decimal | 16 | 17 | 2 | 3 | 4 | 5 | 6 | 7 |

| Encoded Hex Input | 0 | 1 | 2 | 3 | 4 | 5 | 6 | 7 |
|---|---|---|---|---|---|---|---|---|
| Decoded Decimal | 0 | 17 | 2 | 3 | 4 | 5 | 6 | 7 |

| 5-bit reglist | GPRs selected | | | | | | | | |
|---|---|---|---|---|---|---|---|---|---|
| 00001 | 16 | | | | | | | | |
| 00010 | 16 | 17 | | | | | | | |
| 00011 | 16 | 17 | 18 | | | | | | |
| 00100 | 16 | 17 | 18 | 19 | | | | | |
| 00101 | 16 | 17 | 18 | 19 | 20 | | | | |
| 00110 | 16 | 17 | 18 | 19 | 20 | 21 | | | |
| 00111 | 16 | 17 | 18 | 19 | 20 | 21 | 22 | | |
| 01000 | 16 | 17 | 18 | 19 | 20 | 21 | 22 | 23 | |
| 01001 | 16 | 17 | 18 | 19 | 20 | 21 | 22 | 23 | 30 |
| 10000 | 31 | | | | | | | | |
| 10001 | 16 | 31 | | | | | | | |
| 10010 | 16 | 17 | 31 | | | | | | |
| 10011 | 16 | 17 | 18 | 31 | | | | | |
| 10100 | 16 | 17 | 18 | 19 | 31 | | | | |
| 10101 | 16 | 17 | 18 | 19 | 20 | 31 | | | |
| 10110 | 16 | 17 | 18 | 19 | 20 | 21 | 31 | | |
| 10111 | 16 | 17 | 18 | 19 | 20 | 21 | 22 | 31 | |
| 11000 | 16 | 17 | 18 | 19 | 20 | 21 | 22 | 23 | 31 |
| 11001 | 16 | 17 | 18 | 19 | 20 | 21 | 22 | 23 | 30 | 31 |

| 3-bit reglist | GPRs selected | | | | |
|---|---|---|---|---|---|
| 00 | 16 | 31 | | | |
| 01 | 16 | 17 | 31 | | |
| 10 | 16 | 17 | 18 | 31 | |
| 11 | 16 | 17 | 18 | 19 | 31 |

4-bit Immediate Field Encoding — 600

| Encoded Hex Input | 0 | 1 | 2 | 3 | ... | D | E | F |
|---|---|---|---|---|---|---|---|---|
| Decoded Decimal | 0 | 1 | 2 | 3 | ... | 13 | 14 | -1 |

FIG 6A

7-bit Immediate Field Encoding — 620

| Encoded Hex Input | 0 | 1 | 2 | 3 | ... | 7D | 7E | 7F |
|---|---|---|---|---|---|---|---|---|
| Decoded Decimal | 0 | 1 | 2 | 3 | ... | 125 | 126 | -1 |

FIG 6B

9-bit Immediate Field Encoding — 640

| Encoded Hex Input | 0 | 1 | 2 | 3 | 4 | ... | FE | FF | 100 | 101 | 102 | ... | 1FC | 1FD | 1FE | 1FF |
|---|---|---|---|---|---|---|---|---|---|---|---|---|---|---|---|---|
| Decoded Decimal | 256 | 257 | 2 | 3 | 4 | ... | 254 | 255 | -256 | -255 | -254 | ... | -4 | -3 | -258 | -257 |

FIG 6C

FIG 6D — ADDIUR2 Immediate Field Encoding (650)

| | 0 | 1 | 2 | 3 | 4 | 5 | 6 | 7 |
|---|---|---|---|---|---|---|---|---|
| Encoded Hex Input (652, 655) | 0 | 1 | 2 | 3 | 4 | 5 | 6 | 7 |
| Decoded Decimal (657) | -1 | 1 | 4 | 8 | 12 | 16 | 20 | 24 |

FIG 6E — ANDI Immediate Field Encoding (660)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Encoded Hex Input (652, 655) | 0 | 1 | 2 | 3 | 4 | 5 | 6 | 7 | 8 | 9 | A | B | C | D | E | F |
| Decoded Hex (657) | 0080 | 0001 | 0002 | 0003 | 0004 | 0007 | 0008 | 000F | 0010 | 001F | 0020 | 003F | 0040 | 00FF | 8000 | FFFF |

FIG 6F — ADDIUS5 Immediate Field Encoding (670)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Encoded Hex Input (652, 655) | 0 | 1 | 2 | 3 | 4 | 5 | 6 | 7 | 8 | 9 | A | B | C | D | E | F |
| Decoded Decimal (657) | 0 | 1 | 2 | 3 | 4 | 5 | 6 | 7 | -8 | -7 | -6 | -6 | -4 | -3 | -2 | -1 |

FIG 6G — ADDIUS5 Immediate Field Encoding (680)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Encoded Hex Input (652, 655) | 0 | 1 | 2 | 3 | 4 | 5 | 6 | 7 | 8 | 9 | A | B | C | D | E | F |
| Decoded Decimal (657) | 0 | 1 | 2 | 3 | 4 | 5 | 6 | 7 | -8 | -7 | -6 | -6 | -4 | -3 | -2 | -1 |

| | | 15 14 13 12 11 10 | 9 8 7 | 6 5 | 4 3 | 2 1 0 | |
|---|---|---|---|---|---|---|---|
| S3R0 | | Major Opcode | Minor Opcode / Immediate | | | | |
| B16 | | B16=011110 | Immediate | | | | |
| ADDIUSP | | POOL16D=010011 | Immediate | | | | 1 |
| BREAK16 | | POOL16C=010001 | Minor=101000 | Code | | | |
| JRADDIUSP | | POOL16C=010001 | Minor=110000 | Immediate | | | |
| LWM16 | | POOL16C=010001 | Minor=0100 | List | Offset | | |
| SWM16 | | POOL16C=010001 | Minor=0101 | List | Offset | | |
| SDBBP16 | | POOL16C=010001 | Minor Opcode=101100 | Code | | | |
| | | | | | | | |
| S3R1I7 | | Major Opcode | rs1/d | Immediate | | | |
| ADDIUR1SP | | POOL16E=011011 | rd | Immediate | | | 1 |
| BEQZ | | BEQZ16=100011 | rs1 | Immediate | | | |
| BNEZ | | BNEZ16=101011 | rs1 | Immediate | | | |
| LI | | LI16=111011 | rd | Immediate | | | |
| | | | | | | | |
| S3R2I0 | | Major Opcode | Minor Opcode | rs2/d | rs1 | | |
| AND16 | | POOL16C=010001 | Minor=0010 | rs2/d | rs1 | | |
| NOT | | POOL16C=010001 | Minor=0000 | rs2/d | rs1 | | |
| OR16 | | POOL16C=010001 | Minor=0011 | rs2/d | rs1 | | |
| XOR16 | | POOL16C=010001 | Minor=0001 | rs2/d | rs1 | | |
| | | | | | | | |
| S3R2I3 | | Major Opcode | rs2/d | rs1 | Immed | | M |
| ADDIUR2 | | POOL16E=011011 | rd | rs1 | Immed | | 0 |
| SLL16 | | POOL16B=001001 | rd | rs1 | sa | | 0 |
| SSNOP16 | | POOL16B=001001 | rd=0 | rs1=0 | sa=1 | | 0 |
| EHB16 | | POOL16B=001001 | rd=0 | rs1=0 | sa=3 | | 0 |
| PAUSE16 | | POOL16B=001001 | rd=0 | rs1=0 | sa=5 | | 0 |
| SRL16 | | POOL16B=001001 | rd | rs1 | sa | | 1 |
| | | | | | | | |
| S3R2I4 | | Major Opcode | rs2/d | rs1 | Immediate | | |
| ANDI16 | | ANDI16=001011 | rd | rs1 | Immediate | | |
| LBU16 | | LBU16=000010 | rd | base | Immediate | | |
| LHU16 | | LHU16=001010 | rd | base | Immediate | | |
| LW16 | | LW16=011010 | rd | base | Immediate | | |
| SB16 | | SB16=100010 | rs1 | base | Immediate | | |
| SH16 | | SH16=101010 | rs1 | base | Immediate | | |
| SW16 | | SW16=111010 | rs1 | base | Immediate | | |
| | | | | | | | |
| S3R3I1 | | Major Opcode | rd | rs2 | rs1 | | M |
| ADDU16 | | POOL16A=000001 | rd | rs2 | rs1 | | 0 |
| SUBU16 | | POOL16A=000001 | rd | rs2 | rs1 | | 1 |
| NEGU16 | | POOL16A=000001 | rd | rs2=0 | rs1 | | 1 |
| | | | | | | | |
| S5R1I0 | | Major Opcode | Minor Opcode | rs1/d | | | |
| JALR16 | | POOL16C=010001 | Minor=01110 | rs1 | | | |
| JR16 | | POOL16C=010001 | Minor=01100 | rs1 | | | |
| JRC | | POOL16C=010001 | Minor=01101 | rs1 | | | |
| MFHI16 | | POOL16C=010001 | Minor=10000 | rd | | | |
| MFLO16 | | POOL16C=010001 | Minor=10010 | rd | | | |
| | | | | | | | |
| S5R1I5 | | Major Opcode | rd | Immed / Minor Op | | | |
| ADDIUS5 | | POOL16D=010011 | rs1 / rd | Immediate | | | 0 |
| LWSP | | LWSP16=010010 | rs1 | Immediate | | | |
| SWSP | | SWSP16=110010 | rd | Immediate | | | |
| | | | | | | | |
| S5R2I0 | | Major Opcode | rd | rs1 | | | |
| MOVE16 | | MOVE16=011000 | rd | rs1 | | | |
| NOP16 | | MOVE16=011000 | rd=0 | rs1=0 | | | |

| | 31 30 29 28 27 26 | 25 24 23 22 21 | 20 19 18 17 16 | 15 14 13 12 11 | 10 9 8 7 6 | 5 4 3 2 1 0 |
|---|---|---|---|---|---|---|
| R0 | Major Opcode | | Immediate / Minor Opcode / Other | | | |
| BREAK | POOL32A=000000 | | Code | | | Minor = 000111 |
| SDBBP | POOL32A=000000 | | Code | | Opcode Extension=1101101101 | POOL32Axf=111100 |
| | | | | | | |
| R0I26 | Major Opcode | | Immediate | | | |
| JALX | JALX = 111100 | | Target | | | |
| J | J32 = 101110 | | Target | | | |
| | | | | | | |
| R1I16 | Major Opcode | Minor Opcode | rs1/d | Immediate | | |
| BEQZC | POOL32I = 000010 | Minor = 00111 | rs1 | Immediate | | |
| BNEZC | POOL32I = 000010 | Minor = 00101 | rs1 | Immediate | | |
| | | | | | | |
| R1 | Major Opcode | Immediate / Other | rs1/d | Minor Opcode / Other | | |
| MFHI | POOL32A=000000 | >0< | rd | Extension = 0000110101 | | POOL32Axf=111100 |
| MFLO | POOL32A=000000 | >0< | rd | Extension = 0001110101 | | POOL32Axf=111100 |
| | | | | | | |
| R2 | Major Opcode | rs2/d | rs1 | Immediate / Minor Opcode / Other | | |
| ANDI | ANDI32=100110 | rd | rs1 | Immediate | | |
| B32 | BEQ32=101100 | rd=0 | rs1=0 | Immediate | | |
| BEQ | BEQ32=101100 | rd | rs1 | Immediate | | |
| LBU | LBU32=101000 | rd | base | Immediate | | |
| LHU | LHU32=101001 | rd | base | Immediate | | |
| LW | LW32=111111 | rd | base | Immediate | | |
| SB | SB32=110000 | rs1 | base | Immediate | | |
| SH | SH32=110001 | rs1 | base | Immediate | | |
| SW | SW32=110111 | rs1 | base | Immediate | | |
| SLL | POOL32A=000000 | rd | rs1 | sa | Minor Opcode = 0000000000 | |
| NOP | POOL32A=000000 | rd | rs1 | sa = 0 | Minor Opcode = 0000000000 | |
| SSNOP | POOL32A=000000 | rd | rs1 | sa = 1 | Minor Opcode = 0000000000 | |
| EHB | POOL32A=000000 | rd | rs1 | sa = 3 | Minor Opcode = 0000000000 | |
| PAUSE | POOL32A=000000 | rd | rs1 | sa = 5 | Minor Opcode = 0000000000 | |
| SRL | POOL32A=000000 | rd | rs1 | sa | Minor Opcode = 0001000000 | |
| JALR | POOL32A=000000 | rd | rs1 | Opcode Extension = 0000111100 | | POOL32Axf=111100 |
| JR | POOL32A=000000 | rd=0 | rs1 | Opcode Extension = 0000111100 | | POOL32Axf=111100 |
| LWP | POOL32B=000001 | rs1 | base | Offset | | LWP=0001 |
| LWM | POOL32B=000001 | reglist | base | Offset | | LWM=0101 |
| SWP | POOL32B=000001 | rs1 | base | Offset | | SWP=1001 |
| SWM | POOL32B=000001 | reglist | base | Offset | | SWM=1101 |
| | | | | | | |
| R3 | Major Opcode | rs2 | rs1 | rs3/d | Immediate / Minor Opcode / Other | |
| ADDU | POOL32A=000000 | rs2 | rs1 | rd | ✗ | Minor Opcode = 0101010000 |
| AND | POOL32A=000000 | rs2 | rs1 | rd | ✗ | Minor Opcode = 1001010000 |
| OR | POOL32A=000000 | rs2 | rs1 | rd | ✗ | Minor Opcode = 1010010000 |
| SUBU | POOL32A=000000 | rs2 | rs1 | rd | ✗ | Minor Opcode = 0111010000 |
| XOR | POOL32A=000000 | rs2 | rs1 | rd | ✗ | Minor Opcode = 1100010000 |

VARIABLE REGISTER AND IMMEDIATE FIELD ENCODING IN AN INSTRUCTION SET ARCHITECTURE

CROSS-REFERENCES TO RELATED APPLICATIONS

The present application is related to application Ser. No. 61/051,642, entitled "Compact Instruction Set Architecture", filed May 8, 2008, the content of which is incorporated herein by reference in its entirety.

BACKGROUND OF THE INVENTION

This invention relates generally to the Instruction Set Architectures (ISA) of microprocessors. More particularly, the invention discloses methods and means for reducing the amount of memory required to store executable codes while maintaining compatibility with uncompressed legacy assembly code.

As the size of a RISC microprocessor and the memory required to store executable code increases so too does the manufacturing cost. There is a need, especially for embedded applications, to lower the silicon area of devices. One way to lower the area is to reduce the memory required to store the microprocessor instructions the comprise a typical application code.

There is a need for reducing instruction code size without sacrificing functionality or impacting performance or design complexity.

BRIEF SUMMARY OF THE INVENTION

The present invention provides methods and means for reducing the code size of applications compiled to execute in a microprocessor of RISC Architecture. In one embodiment, instructions are encoded in a length of 16-, 32- or 48-bits with a first subset of instructions having both a 16-bit compact encoding length and a 32-bit normal encoding length and a second subset of instructions having both a 32-bit normal encoding length and a 48-bit extended encoding length. For applications that have size restrictions on the amount of available memory, the compact and normal form of instructions may be used. For applications that require high performance, the normal forms and extended form of instructions may be used. Applications can be tuned for specific cost, code size, and performance characteristics by judicious selection of the encoding length implemented for various parts of the application. For example, a device that has boot code operating from expensive flash memory and application code executing from inexpensive RAM could use compact form encoding length instructions for its boot code instructions while maximizing application performance by using the normal or extended forms for application code instructions. Additionally, compilers, assemblers, and linkers are provided for generating executable forms of software applications using the 16-, 32- and 48-bit forms of the RISC Architecture instructions.

In another embodiment, instructions of the RISC Architecture are encoded in a separate legacy encoding comprising instructions only encoded in 32-bit lengths. Compilers, assemblers, and linkers are provided to compile software objects using legacy forms of instructions and to combine the legacy encoded software objects with software objects compiled using the 16-, 32-, and 48-bit encoding lengths. Further, means and methods are provided to determine the encodings that a microprocessor is enabled to decode and execute. Means and methods are also provided to selectively control the encoding used by the microprocessor for execution of software when the microprocessor is enabled to execute more than one encoding.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIGS. 5A through 5D are tables correlating encoded register field values with their associated decoded values.

FIGS. 6A through 6G are tables correlating encoded immediate field values with their associated decoded values.

FIG. 8A shows the 16-bit encodings of the subset of instructions from the ISA of the present invention having both 16-bit and 32-bit encoding lengths.

FIG. 8B shows the 32-bit encodings of the subset of instructions from the ISA of the present invention having both 16-bit and 32-bit encoding lengths.

DETAILED DESCRIPTION OF THE INVENTION

Figure 1:
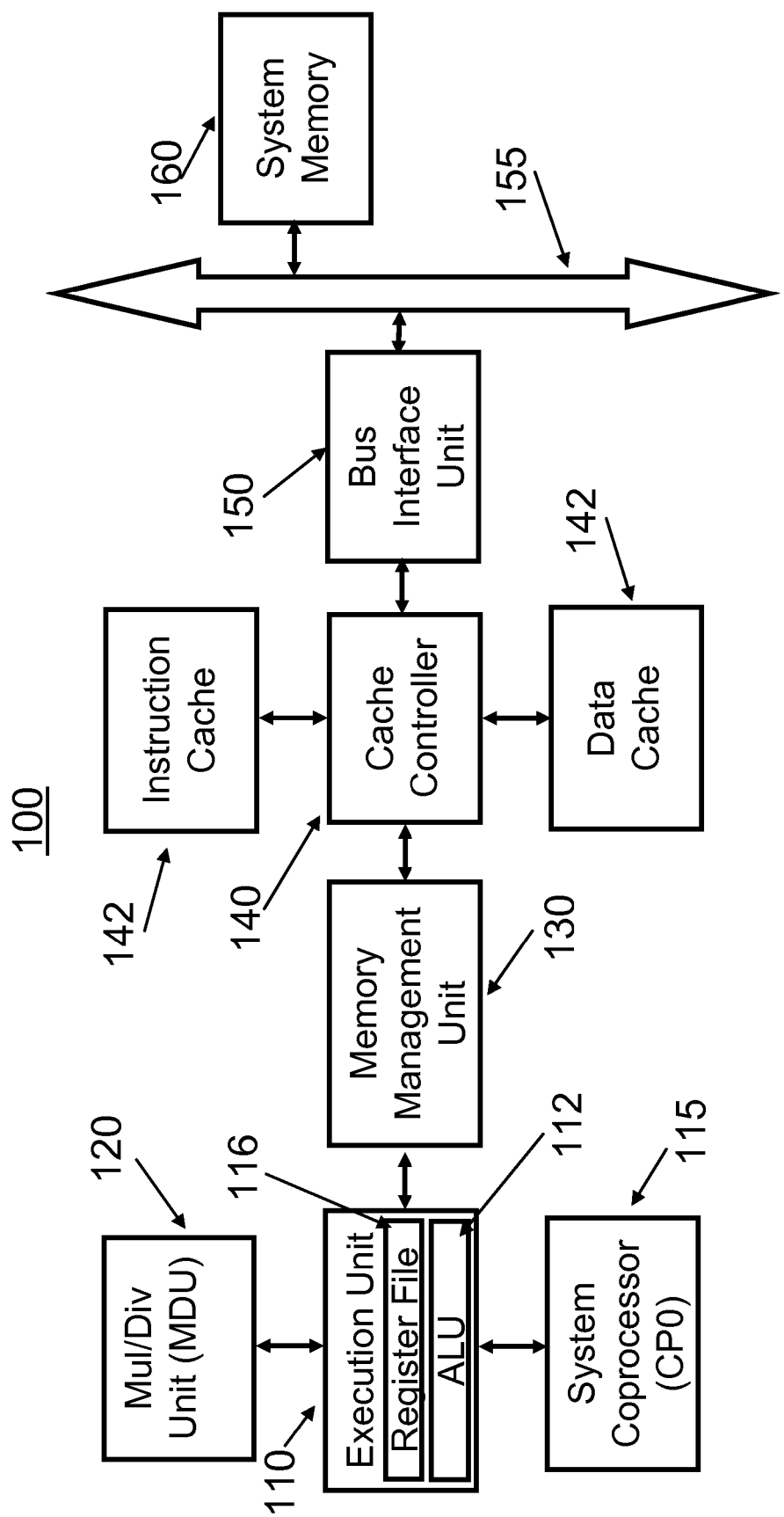
FIG. 1 is a block diagram of a single Instruction Set Architecture (ISA) microprocessor system utilizing the present invention.

The present invention provides methods and means for reducing the instruction code size of software executed in a microprocessor of RISC Architecture. Method embodiments of the invention are encoded in instructions that can be efficiently stored as part of a computer program. Apparatus embodiments of the invention execute instructions according to the invention. As described herein, instructions according to the invention can be executed by microprocessors enabled to decode one encoding of the instructions of the RISC Architecture or by microprocessors enabled to decode more than one encoding of the instructions of the RISC Architecture.

Microprocessors embodying the RISC Architecture of the present invention are designed to operate in several different security modes. Each of the security modes define and control what microprocessor resources or features a software application executing in that security mode can access. In on embodiment, microprocessors have at least two operating modes, referred to as "privileged" or "kernel"" mode, and "user" mode. When a microprocessor is powered on or reset, it begins operating in privileged mode. This means that the initial set of instructions that execute have access to all of the resources of the microprocessor, and can define how the microprocessor is to operate, how it should be configured for its present environment, etc. After configuration of the microprocessor is complete, the operating mode may be switched to user mode. In user mode, software access to general-purpose registers is allowed, but no access is allowed to privileged architecture registers that control the operation or configuration of the microprocessor. Such a dual mode architecture provides security for the computing system, insures reliability of the operating environment, and prevents user mode instructions from accessing or modifying privileged resources.

In one embodiment, the RISC Architecture of the present invention has three elements: (1) the Instruction Set Architecture (ISA), (2) the Privileged Resource Architecture, and (3) the Architecture Specific Extensions (ASEs). The ISA defines the instructions, including encodings, which will execute on a microprocessor embodiment of the Architecture. The Privileged Resource Architecture defines the set of environments and capabilities on which the ISA operates, providing the mechanisms necessary to manage the resources of a microprocessor implementation of the RISC Architecture such as security modes, virtual memory, caches, exceptions, user contexts, etc. The ASEs provide instruction and architectural support for optional application specific extensions.

In one embodiment, the ISA provides for up to four coprocessors, designated CP0, CP1, CP2, and CP3. CP1, CP2, and CP3 are optional. CP0 is required. CP0, the system coprocessor, provides the software interface to the Privileged Resource Architecture. Special privileged mode instructions are used to access and modify the coprocessors.

In one embodiment, Registers contained in CP0 provide access to both the configuration information and the configuration management and control functions necessary to make a microprocessor operable with software based applications. For example, certain registers are used to configure cache, define how exceptions are handled, and to configure memory management. In one embodiment, CP0 contains up to 256 registers organized into 32 groups of 8. The 32 groups are labeled as Coprocessor 0, Register n, where n runs from 0 to 31 while registers within each group are labeled as select register m, where m runs from 0 to 7. For example, CP0 Register 0, select 3 refers to the $3^{rd}$ register (0×8+3) located in CP0, while CP0 Register 16, select 3 refers to the 131st register (16×8+3) located in CP0.

In one embodiment the Architecture comprises the following CPU registers:

Thirty-two general purpose registers (GPRs). Three of the general-purpose registers have assigned functions and are used in the performance of certain software operations:

Register R0 is also labeled as zero. It is hardwired to a value of zero and can be used as the target register for any instruction whose result is to be discarded. R0 can also be used as a source when a zero value is needed.

Register 29 (R29) is also labeled as stack pointer register SP. The function of SP is explained later.

Register 31 (R31) is also labeled as return register RA. The function of RA is explained later.

A pair of special-purpose registers(HI and LO) to hold the results of integer multiply, divide, and multiply-accumulate operations.

A special-purpose program counter (PC), which holds the address of the instruction currently being executed. The address of the instruction that will be executed next is determined by assigning a value to PC during the execution of the current instruction. If no value is assigned to PC during the current instruction execution, PC is automatically incremented to the address of the next sequential instruction. In the special case of jump/branch instructions, extra time is required to calculate the jump or taken branch target address. Rather than having the microprocessor stall waiting for the calculation to complete, the next sequential instruction in memory is executed and the taken jump/branch target address is assigned to the PC during the execution of this "delay slot" instruction.

The ISA Mode register is a one-bit register that controls the instruction encoding a microprocessor decodes. The operation of the ISA Mode register, hereinafter called the ISA Mode bit, is described later.

FIG. 1 depicts a example environment for implementation of the present invention. Specifically, FIG. 1 depicts a microprocessor system 100 for implementing the present invention. System 100 comprises an execution unit 110, a system coprocessor 115, a multiply/divide unit 120, a memory management unit 130, a cache controller 140, caches 142, a bus interface unit 150, a microprocessor memory bus 155, and a memory 160. Bus interface unit 150 couples cache controller 140 to Bus Interface Unit 150. System memory bus 155 Execution unit couples Bus Interface Unit 150 to System Memory 160. Execution unit 110 has an arithmetic logic unit 112 and a register file 116. Microprocessor system 100 is exemplary and not intended to limit the invention. For example, in other embodiments caches 142 and cache controller 140 may be omitted from microprocessor 100.

In an embodiment, register file 116 has thirty-two General Purpose registers (GPRs), labeled R0-R31. In other embodiments, register file 116 may have more or less than thirty-two GPRs. Registers 29 and 31 have functions in addition to their normal GPR function. Accordingly, GPR 29 is also labeled as stack pointer register SP while GPR R31 is also labeled as return address register RA. While these labels are used below to further describe the invention, those skilled in the art will recognize that these labels are illustrative and not intended to limit the invention.

Figure 2:
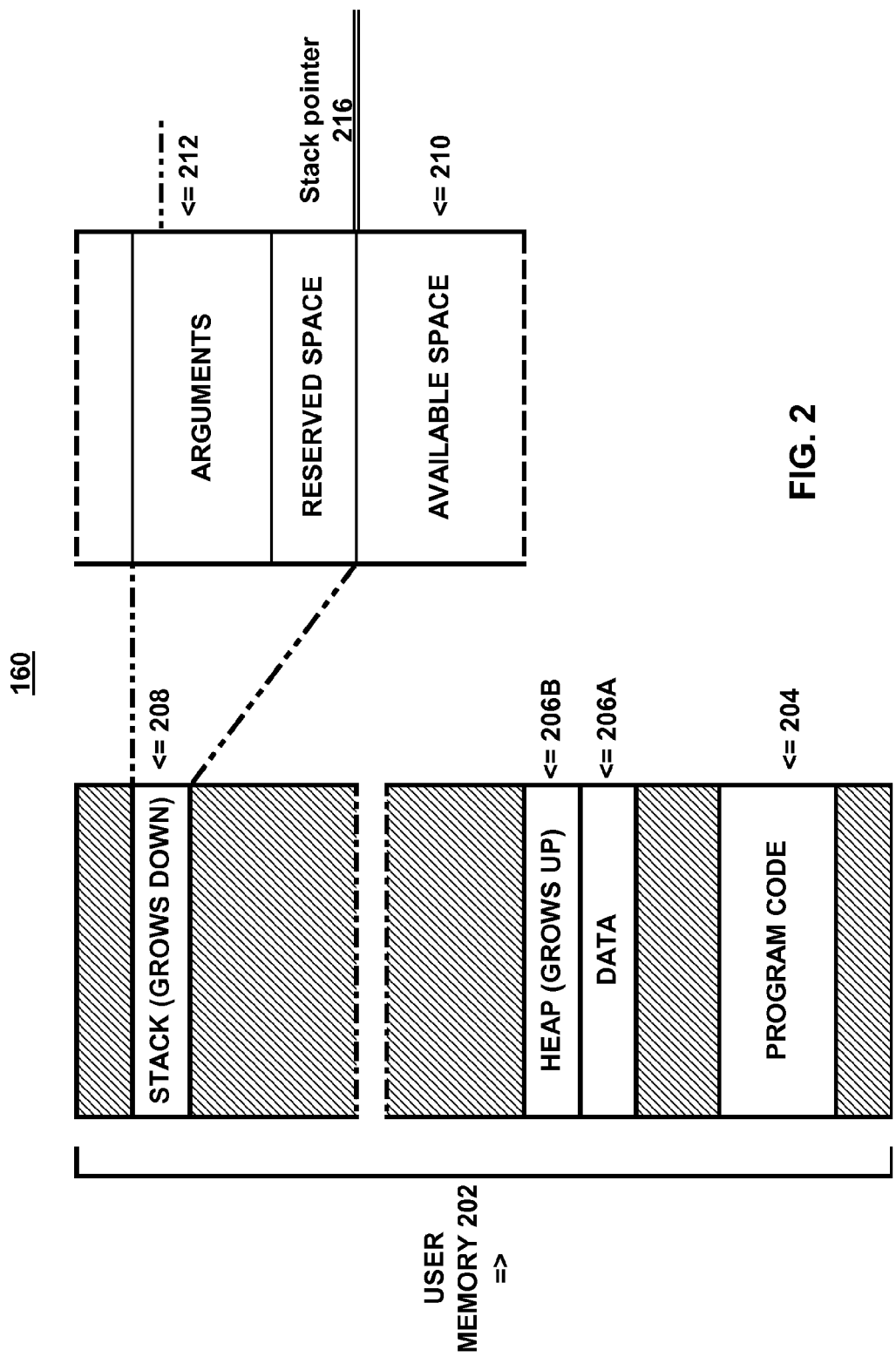
FIG. 2 illustrates a portion of system memory of FIG. 1 in greater detail.

FIG. 2 illustrates a portion of system memory 160 in greater detail. System memory 160 comprises a user memory 202 and an operating system memory (not shown). User memory 202 comprises five regions of interest. These regions are a program code region 204, a data region 206A, a heap region 206B, a stack region 208, and an unused or available space region 210. As can be seen in FIG. 2, stack region 208 typically comprises a region 212 for passing values to a subroutine via memory 104, and a reserved space for storing values passed to a subroutine in a register. A stack pointer (SP) 216 indicates the address of the next available memory location in region 210 of memory 104.

The program code region 204 is used to store the instructions of a program being executed by system 100. Program instructions to be executed by the microprocessor must be read into microprocessor system 100 from the program code region 204 in main memory 104.

Heap 206B is used for globally meaningful or long-lived dynamic data, while stack 208 is used for locally significant and short-lived dynamic data. Allocation of heap memory 206B involves software manipulation of data structures in memory that control its explicit allocation. Allocation of dynamic data on stack 208 is done simply by updating the stack pointer 216 and remembering the stack pointer offset of each allocated data item. As shown in FIG. 2, stack 208 grows from higher memory addresses to lower memory addresses. In other embodiments of the invention, stack 208 can grow from lower memory addresses to higher memory addresses. The data region 206A is used to store static data.

The present invention is now described with reference to the features of system 100 which provides an example environment for implementation of the invention. It will be apparent to a person skilled in the art, however, that the invention can be implemented in other microprocessor environments.

In one embodiment, the RISC Architecture is the MIPS Architecture. The documents detailing the MIPS32® and the MIPS64® Architecture, listed above, have been previously incorporated by reference. In one embodiment, the Privileged Resource Architecture is described in Volume III of the MIPS32® Architecture Manuals. In another embodiment, the Privileged Resource Architecture is described in Volume III of the MIPS64® Architecture Manual. The CP0 registers for each embodiment are described in their respective Volumes III of the MIPS Architecture documents. The present invention is now further described with reference to the MIPS32® Architecture which provides an example environment for implementation of the invention. It will be apparent to a person skilled in the art, however, that the invention can be implemented in other microprocessor environments.

Figure 3:
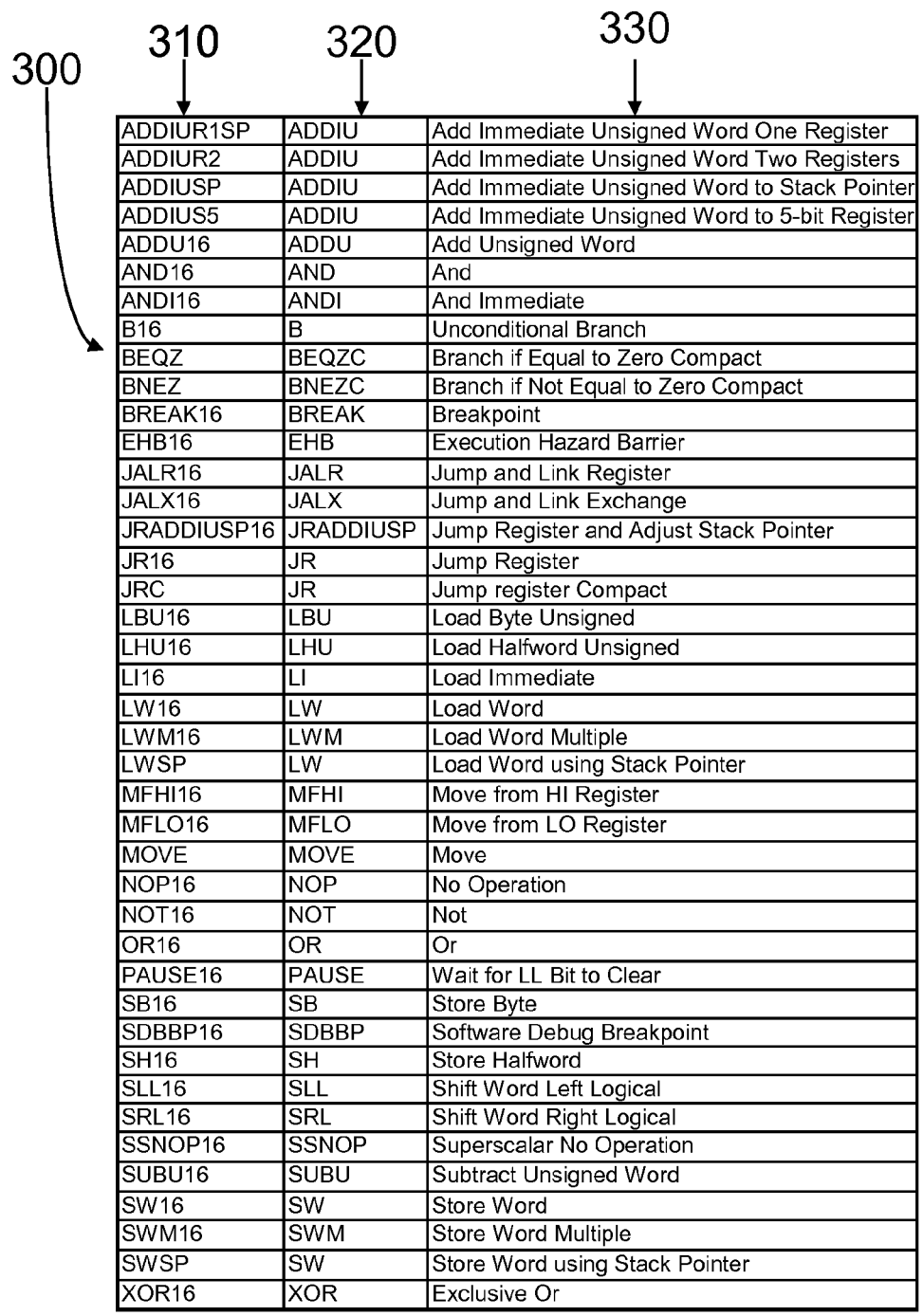
FIG. 3 lists a subset of instructions from the ISA of the present invention having both 16-bit and 32-bit length encodings

In one embodiment, the present invention has the Privileged Resource Architecture of the MIPS32® Architecture and an instruction set comprising the instructions listed in the MIPS Architecture Manual, Volume I-b, previously incorporated by reference. Some instructions have both 16-bit and 32-bit encoding lengths. FIG. 3, Table 300 lists the instructions having dual encodings. Column 310 of Table 300 list the mnemonics of the 16-bit instructions. Column 320 list the mnemonics of instructions having 32-bit encoding lengths. Column 330 provide a synopsis of the operation of the instructions whose mnemonics are associated with the row containing the instruction synopsis. Where appropriate, the number 16, representing the number bits in the instruction, is appended to the mnemonic to differentiate between instructions that would otherwise have the same mnemonic associated with two different encoding lengths.

The instruction encodings are composed of a plurality of fields. Each instruction encoding has a 6-bit major opcode field left aligned within the instruction encoding. The major opcode field binary value indicates the instruction width, thereby facilitating fetching and execution of instructions by a microprocessor implementing an embodiment of the present invention. The quantity, composition, length and alignment of other fields within the instruction encoding, such as register fields, immediate fields and minor opcode fields, are instruction dependent.

Figure 4:
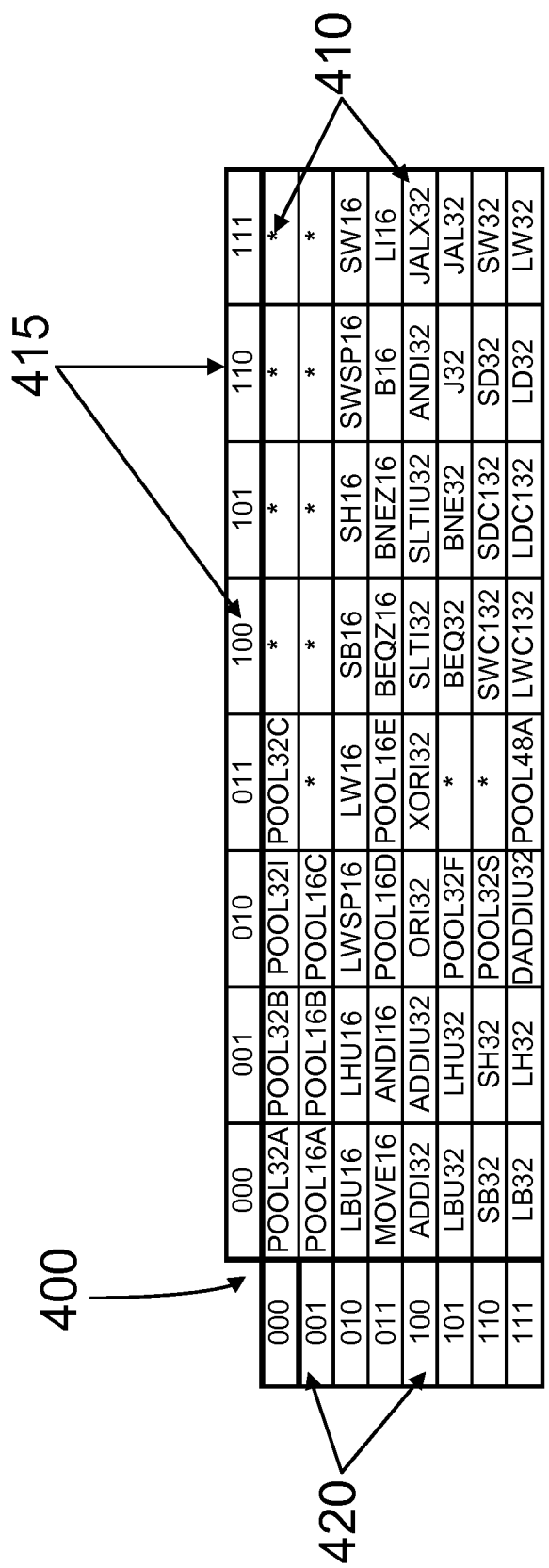
FIG. 4 is a table that correlates the binary bit encodings of the 6-bit major opcodes of the present invention with their associated mnemonics.

Table 400 in FIG. 4 shows the mapping of the major opcode mnemonics of the present invention to their associated six bit binary encodings. Boxes 410 contain the major opcode mnemonics. The length of the instruction associated with each mnemonic is indicated by the numbers 16, 32, and 48 located at the end of the mnemonics. For example, major opcode POOL16A relates to 16-bit instructions while major opcode POOL48A relates to 48-bit instructions. The boxes 410 containing an asterisk are reserved for future expansion of the instruction set. A microprocessor enabled to execute instructions according to the present invention must cause a Reserved Instruction Exception when executing an instruction having a major opcode corresponding to a box containing an asterisk. The row of boxes 415 contain binary bit values of the three Most Significant Bits (MSBs) of the mnemonics. The column of boxes 420 contain binary bit values of the remaining three bits of the mnemonics. The encoding of a particular opcode is obtained by locating the opcode in Table 400 and concatenating the contents of the box 415 associated with the column containing the opcode with the contents of the box 420 associated with the row containing the opcode. As an example of this method for determining the binary value of a particular opcode, consider the major opcode BEQ32. The associated box 415 contains the binary value 100; the associated box 420 contains the binary value 101. Concatenating the two binary values produces the six bit opcode 100101 associated with BEQ32.

Note that Table 400 of FIG. 4 illustrates that all the major opcodes for the 16-bit instructions are grouped in three adjacent rows. This Least Significant Bit grouping of major opcode allows instructions to be easily separated into instructions having 16-bit lengths and instructions not having 16-bit lengths. For example, if A represents the binary value of LSB bit 2, B the value of LSB bit 1 and C the value of LSB bit 0 the Boolean expression (NOT A) AND (B OR C) produces a '1' for 16-bit opcodes and a '0' for all other opcodes. This easy separation of instruction length by opcode facilitates fetching and execution of instructions by a microprocessor implementing an embodiment of the present invention.

Each instruction encoding can have from 0 to 4 register fields. Instruction register fields are designated as rs1, rs2, rs3, and rd. The three rs fields are operand fields designating microprocessor registers holding information to be used in the execution of an instruction while rd is an operand field designating the microprocessor register that receives the result of the instruction execution. The register field length is 5 bits for 32-bit and 48-bit instructions. The register field length for 16-bit instructions is either 5-bits or 3-bits with the length being major opcode dependent. Most 5-bit register fields are encoded linearly, i.e. the value contained in the register field is the number of the GPR used in the execution of the instruction. 3-bit register fields and some 5-bit register fields have instruction specific register encoding, i.e. the value in the register field is used as an offset into a table that returns the actual GPR or list of GPRs to be used in the execution of the instruction. The GPRs selected by decoding the register fields correspond to register conventions defined in the O32 MIPS Application Binary Interface (ABI). The O32 MIPS ABI is described in Chapter 11 of the See MIPS Run Linux manual listed previously. The contents of 3-bit register fields are decoded according to the tables shown in FIG. 5A, 5B or 5D. The contents of encoded 5-bit register fields are decoded according to the table shown in FIG. 5C. Table 500 in FIG. 5A and Table 520 in FIG. 5B maps the linearly encoded register field hex values contained in rows 505 to the decimal GPR values contained in rows 510. The GPRs enumerated in the table entries of rows 510 are GPRs defined by the ABI for use in subroutine calls. Table 540 in FIG. 5C and Table 560 in FIG. 5D link the hex values contained in a reglist register field with lists of GPRs. The hex values in the table entries of columns 550 function as pointers to the variable length lists of GPRs shown in rows 545. The GPRs enumerated in the lists are defined by the ABI for holding variables that must be preserved across subroutine calls. Consider an example using the mapping of Table 540 in FIG. 5C: if the 5-bit register field of the LWM instruction, described later, holds the value 4, GPRs 16, 17, 18, and 19 will be used in the execution of the LWM instruction. Henceforth, decoding the contents of a register field value will be taken to mean decoding using one of tables 5A, 5B, 5C, or 5D.

Not all instructions have immediate fields or minor opcode fields. Minor opcode field length and position within the instruction encoding is instruction dependent. The term 'immediate field' as used here includes the address offset field for branches and load/store instructions as well as jump target fields. Immediate field length and position within the instruction encoding is instruction dependent. Some instructions have an immediate field which is split into several regions. Some 16-bit instructions have immediate fields whose contents must be decoded in a non-linear fashion in order to produce the immediate value to be used in the execution of the instruction. FIGS. 6A, 6B, 6C, 6D, 6E, 6F, and 6G present tables indicating the non-linear decoding used by the various instructions. Table 600 in FIG. 6A illustrates the non-linear decoding applied to a 4-bit immediate field, table 620 in FIG. 6B illustrates the decoding for a 7-bit immediate field, and table 640 in FIG. 6C illustrates the decoding for a 9-bit immediate field. The table entries in rows 610 of tables 6A, 6B and 6C contain the encoded hex values located in the immediate fields; the table entries in rows 615 of tables 6A, 6B and 6C contain the decoded decimal value associated with their corresponding entries in rows 610. FIGS. 6D, 6E, 6F and 6G present tables indicating the non-linear decoding used by the instruction whose mnemonic is contained in rows 652 of tables 650, 660, 670 and 680. The hex entries in rows 655 of the four tables are the hex values in the immediate field of the instruction named in rows 652 of the four tables. The contents of rows 657 of the four tables are the decoded values of the immediate field of the instruction named in rows 652 of the four tables. The decoded values in row 657 of table 660 in FIG. 6F are presented in hex format; the decoded values in rows 657 of the remaining three tables are presented in decimal format.

Figure 7A:
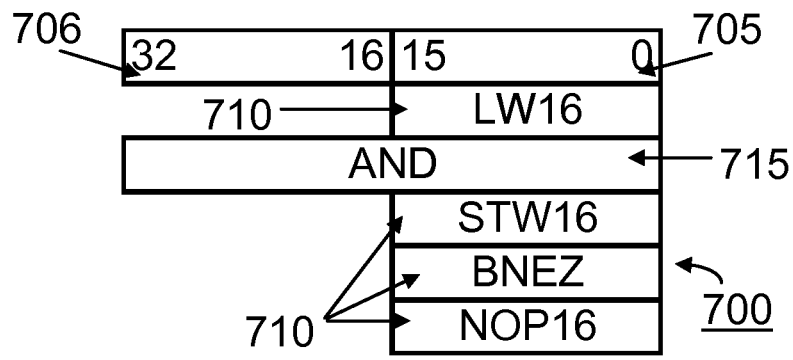
FIGS. 7A through 7C present big-endian and little-endian placements in memory of an exemplary sequence of instructions from the ISA of the present invention.
Figure 7B:
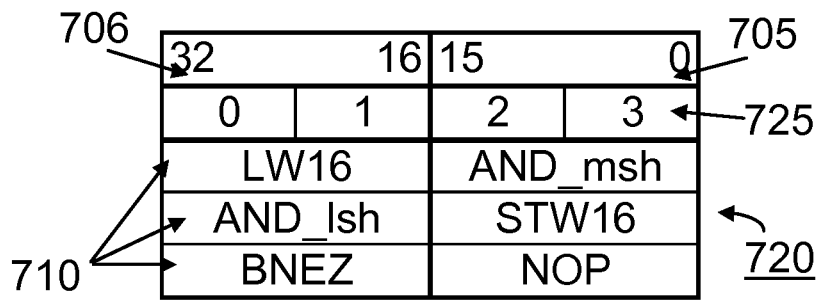
Figure 7C:
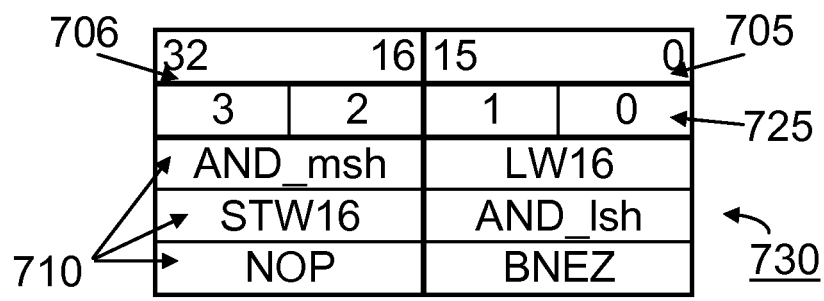

The instructions are placed in microprocessor memory according to system endianess. The instructions are fetched or stored in groups of 16-bits. On a 32-bit microprocessor with 32-bit memory in big-endian mode, 16-bit instructions are stored in half-word order first in bits 31-16 (bytes 0 and 1, half-word 1) and then in bits 15-0 (bytes 2 and 3, half-word 0). On a 32-bit microprocessor in little-endian mode, 16-bit instructions are stored in half-word order first in bits 15-0 (bytes 1 and 0) and then in bits 31-16 (bytes 3 and 2). 32-bit instructions are stored as two 16-bit half-words; 48-bit instructions are stored as three 16-bit half-words. Instructions are placed in memory such that they are in order with respect to the address. Consider the following example, illustrated in FIGS. 7A, 7B and 7C. FIG. 7A shows a hypothetical sequence 700 of 5 instructions: one 16-bit instruction, followed by a 32-bit instruction, followed by 3 16-bit instructions. Cells 710 contain the 16-bit instructions, cell 715 contains the 32-bit instruction. The contents of cell 705 indicate the bit order in memory of half-word 0 of a 32-bit memory; the contents of cell 706 indicate the bit order in memory of half-word 1 of a 32-bit memory. The bit order in memory is independent of endian order. Memory layout 720 of FIG. 7B shows the order in which the half-words 710 comprising instructions according to the present invention are located in memory in big-endian order. The cells in row 725 of layout 720 in FIG. 7B indicate the addressing order of the bytes in memory. Note that the 32-bit AND instruction is comprised of two half-words with the most significant (msh) and least significant half-words (lsh) distributed across two 32-bit memory locations. Memory layout 730 of FIG. 7C illustrates little endian placement in a 32-bit memory of instructions according to the current invention.

In one embodiment, a microprocessor is enabled to execute instructions from both the ISA of the current invention and a second ISA. The second ISA may, for example, be the ISA comprising legacy instructions. The second ISA may have been used for the development of programs consisting of instructions from the second ISA. The second ISA is hereinafter known as the legacy ISA. In one embodiment, the legacy ISA may be the MIPS32® ISA. The two ISA microprocessor may provide, for example, a way to cost effectively migrate software applications from the legacy ISA to the more efficient ISA of the current invention. That is, the program could be migrated gradually, having some portions executing legacy instructions and other portions executing using instructions from the ISA of the current invention. In this situation, where an application may contain instructions from two different ISAs, the microprocessor is enabled to detect and control the ISA whose instructions are used in various portions of the application.

In one embodiment, CP0 contains registers that are used for ISA detection and control. The number of ISAs that are enabled on a microprocessor is indicated by bit 15 of CP0 Register 16, select 3, hereinafter known as config3[15]. In one embodiment, a microprocessor that can execute instructions from two ISAs has config3 [15] permanently set to a value of '1' while a microprocessor that can only execute instruction from a single ISA has config3[15] permanently set to a value of '0'. In one embodiment, a microprocessor enabled to use two ISAs can select the ISA used for instruction execution in both privileged and user modes of operation. The method used to select the ISA whose instructions execute during user mode instruction execution is described later with reference to the JALX instruction. The ISA whose instructions execute when the microprocessor operates in privileged mode is selected as follows. There are four events that cause the microprocessor to operate in privileged mode: (1) the microprocessor is reset/powered on or receives a Non-Maskable Interrupt (NMI), (2) some event external to the microprocessor signals an interrupt, (3) an exception is generated as a by-product of instruction execution e.g. arithmetic overflow, or (4) a system call or trap instruction is executed. Events (2), (3), and (4) are all exceptions that can occur in the course of software execution. Exceptions must be processed in privileged mode, but when exception processing is complete, software execution can resume normally in the mode and with the ISA whose instructions were executing when the exception occurred, i.e. no initialization or re-initialization of the microprocessor is required. In an embodiment, config3[16] set to a value of '1' selects the ISA of the current invention as the ISA whose instructions are executed when exceptions are processed while config3[16] set to a value of '0' selects the legacy ISA as the ISA whose instructions are executed when exceptions are processed. In one embodiment, config3[16] may be set to a permanent value. In other embodiments, config3 [16] may be set and cleared under control of software executing on the microprocessor or it may be controlled by signals external to the microprocessor e.g. a signal generated by varying the position of a hardware switch mounted on motherboard. An event (1) occurrence differs from events (2), (3) or (4) in that an event (1) requires that the microprocessor be initialized ('booted') or re-initialized ('re-booted'), i.e. operations such as cache setup, configuration of the memory management unit, and disabling or enabling interrupts are done. In an embodiment, bit 14 of CP0 Register 16, select 3, hereinafter config3[14], set to a value of '1' selects the ISA of the current invention as the ISA whose instructions are executed to perform initialization while config3[14] set to a value of '0' selects the legacy ISA as the ISA whose instructions must be executed to perform initialization. In one embodiment, config3[14] may be set to a permanent value. In other embodiments, config3[14] may be set and cleared under control of software executing on the microprocessor or it may be controlled by signals external to the microprocessor, e.g. a signal generated by varying the position of a hardware switch mounted on a motherboard.

In one embodiment, a microprocessor enabled to execute instructions from two ISAs uses the value of the ISA Mode bit to determine the ISA whose instructions are executed. Execution of certain instructions cause the value of the ISA Mode bit to change. Specifically, execution of the JALX instruction always changes the value of the ISA Mode bit, and execution of the JRADDIUSP, JRC, JALR, or JR instructions may change the value of the ISA Mode bit. The sequence of steps that result in the ISA mode bit being changed is given below with regard to the description of operation of the JALX and JRADDIUSP instructions. If an exception occurs during instruction execution, the microprocessor saves the ISA mode bit along with the address indicating the location of the last successfully executed instruction in a CP0 register determined by exception type. At the conclusion of exception processing, the microprocessor may restore the saved values and continue execution at the address and with the ISA operative at the time the exception occurred. Alternatively, the saved values may be modified by the exception processing software to cause execution to continue at a different address and with instructions of the other ISA.

In another embodiment, a microprocessor is enabled to only execute instructions of the ISA of the current invention. In this case, bit 15 of CP0 Register 16, select 3, hereinafter known as config3[15] is fixed to '0', config3[14] is fixed to '1', config3[16] is fixed to '1', and the ISA Mode bit is fixed to 1.

In yet another embodiment, a microprocessor is enabled to only execute instructions of the legacy ISA. In this case, config3[15] is fixed to '0', config3[14] is fixed to '0', config3 [16] is fixed to '0', and the ISA Mode bit is fixed to 0.

In an embodiment, the instructions of the ISA of the current invention are encoded in 16-, 32- or 48-bits with a first subset of instructions having both a 16-bit compact encoding length and a 32-bit normal encoding length and a second subset of instructions encoded in both 32-bit normal and 48-bit extended encoding lengths. The instructions having extended encoding lengths were selected to provide high performance by incorporating larger immediate fields than would be possible instructions having normal encoding lengths. The instructions having compact encoding length were chosen based on three criteria: (1) cost, (2), statistical frequency of occurrence, and (3) necessity or convenience.

Encoding cost was determined by calculating the number of bits required to encode all the operands and parameters of the individual instructions in the MIPS32 ISA and assigning encoding cost values based on the number of calculated bits. For example, the Move From Hi (MFHI) and Move From Lo (MFLO) instructions were assigned a low encoding cost since they can be minimally encoded in 12 or 13 bits i.e. the instructions require only a 6-bit major opcode, a small number of minor opcode bits, and 5-bits for one register field. On the other hand, the Set on Less Than Immediate Unsigned (SLTIU) instruction was assigned a high encoding cost since it requires a 6-bit major opcode field, a 16-bit Immediate field and 2 5-bit register fields. Once cost assignment was complete, a statistical analysis was performed to determine most likely candidates for 16-bit encoding and to determine on an instruction-by-instruction basis possible strategies for reducing operand field size.

The statistics for the statistical analysis were generated by analyzing existing legacy encodings of MIPS32 and MIPS64 object files and binaries produced by compiling the source code of various applications with a selection of MIPS compilers using a variety of optimizations. The analysis comprised determining the occurrence frequency of instructions and their associated operand field values (e.g. register field and Immediate field values). The analysis results were used to rank instructions by their frequency of occurrence and to select most commonly used operand field values. The most frequently used instructions were ranked by their cost, and the least cost most frequently occurring instructions were re-encoded in 16-bit lengths. In some cases the register field and/or immediate field functionality was reduced to fit a 16-bit encoding with the statistical analysis used to select field values. For example, register fields were reduced to three bits with the field values selecting special translation tables referencing most commonly used registers or register combinations, while immediate field lengths were reduced with the field values selecting special translation tables containing offset values that had a statistically high occurrence rate. It should be noted that compiler design results in the most commonly used registers being registers specified in the MIPS software Application Binary Interface (MIPS ABI). Finally, in some cases instructions were encoded in 16-bits solely because the instruction had special functionality deemed essential or convenient, e.g. debug instructions such as Set Debug Break Point (SDBBP16) and BREAK16.

Code size reduction is accomplished by replacing the 32-bit normal encoding length instructions of the first subset with the corresponding 16-bit compact encoded length instructions. For software applications having code size restrictions, the compact and normal forms of instruction encodings are used. For software applications having performance requirements , the normal and extended forms of instruction encodings are used. Specially enhanced and tuned compilers and assemblers are used to automatically effect the substitution. Pre-selected code size and performance requirements can be provided to the compilers and assemblers to control the tuning performed in a compiling and/or assembly process. For example, flags indicating various levels of code size or performance optimizations can be appended to the command line information usually provided to the compiler/ assembler as part of the normal compilation/assembly process. Further, the enhanced assemblers and linkers have the means to generate software objects comprising instructions from both the ISA of the current invention and from the legacy ISA and to combine the objects into modules that can be executed on a microprocessor enabled to execute instructions from both ISAs.

FIGS. 8A and 8B show the encodings of the instructions of the ISA of the current invention that have both 16-bit and 32-bit encodings. Table 800 of FIG. 8A lists the 16-bit instructions with their encodings. Table 850 of FIG. 8*b* lists the 32-bit instructions with their encodings. The rows of table 800 and table 850 are grouped according to instruction format. The top row of each group shows the instruction format for the group and the name of the format group. Generally, the format group names describe the number of registers in the group and the length of the immediate field in the group. Additionally, the 16-bit group names start with the letter 'S' followed by a number where the number indicates the width of register fields in the instruction. As an example, consider the group names S3R2I0 and S5R1I5 in table 800. The group name S3R2I0 indicates instructions in that group have 2 three-bit register fields with no immediate field while the group name S5R1I5 indicates instructions in that group have 1 5-bit register field and a 5-bit immediate field. Instructions have fields that can have multiple definitions including an immediate field definition are defined to have no immediate field. Bit fields marked with an 'X' are currently reserved with no definition. Some abbreviations are used to accommodate the bit field size, e.g. single bit minor opcode fields in FIG. 800 are abbreviated with the letter 'M'.

Representative Instructions Illustrating Features of the Present Invention

JALX—Jump and Link Exchange

The format of the 32-bit JALX instruction is shown in FIG. 8B. In one embodiment, when executed by a microprocessor enabled to execute both instructions from the ISA of the present inventions and instructions from the legacy ISA, the JALX instruction places the return address link in RA, executes the instruction in the branch delay slot, changes the ISA Mode bit to its opposite value (i.e. from 1 to 0 or from 0 to 1), and jumps to the effective target address. The return address link is the address of the instruction following the delay slot instruction with bit 0 of the address set to the value of the ISA Mode bit at the time the return address is formed The address of the instruction following the delay slot instruction is formed by adding to the PC a number equal to 4 plus the number of bytes in the branch delay slot instruction. The effective target address is formed by concatenating the contents of bits 31-28 of the return address link with the contents of the Target field shifted left two bits. The branch is a PC region branch (not PC relative) with the effective target address in the 256 MB aligned region defined by return address bits 31-28. Note that this definition of effective target address creates a boundary condition where the branch is to the 256 MB region following the JALX instruction when the JALX instruction is the last word of its 256 MB region. A Reserved Instruction exception is generated if JALX is executed by a microprocessor enabled to execute only instructions from a single ISA.

JRADDIUSP—Jump Register, Adjust Stack Pointer

The format of the JRADDIUSP instruction is shown in FIG. 8A. In one embodiment, when executed by a microprocessor enabled to execute both instructions from the ISA of the present invention and instructions from the legacy ISA, JRADDIUSP sets the ISA Mode bit to the value contained in bit 0 of RA, clears RA bit 0, jumps to the 16-bit aligned address contained in RA, and adjusts the value of the SP using the contents of the Immediate field. The value of the adjusted SP is obtained by shifting the Immediate field left two bits, zero extending the shifted value, adding the extended shifted value to the value of SP and placing the result into SP. When JRADDIUSP is executed by a microprocessor enabled to execute only instructions from the ISA of the present invention, the action of setting the ISA Mode bit to the value contained in bit 0 of RA and clearing RA bit 0 is omitted. In this case, an Address exception is generated on the target instruction fetch if bit 0 of RA differs from the ISA Mode bit. In one embodiment, this instruction does not have a branch delay slot and executes in multiple CPU cycles. The instruction is restarted in its entirety on return from any exception taken during execution.

LWM—Load Word Multiple

The format of the 32-bit LWM instruction is shown in FIG. 8B. In one embodiment, when executed by a microprocessor enabled to execute instructions from the ISA of the present invention, LWM loads a sequence of words starting from an effective address in microprocessor memory and stores them in selected GPRs. The effective address is formed by left shifting the contents of the Immediate field two bits, zero-extending the result to GPR length, adding the zero-extended results to the contents of GPR base, and performing any required virtual to physical address translation. An Address Error exception occurs if the effective address is not 32-bit aligned, i.e. if the two least significant bits of the effective address are non-zero. The selected microprocessor target registers are determined by decoding the contents of register field reglist according to table 540 in FIG. 5C. Encodings not listed in the table are reserved. GPRs 16-23 listed in Table 540 are referred to in the O32 ABI as subroutine register variables; GPR 30 is referred to both as an eighth subroutine register and as a frame pointer; GPR 31 is RA The register numbers and the effective addresses are correlated using the order listed in the table, starting with the left-most register on the list and ending with the right-most register on the list. The effective address is incremented for each subsequent register on the list. This instruction may execute for a variable number of cycles and may perform a variable number of loads from memory. A full restart of the sequence of operations will be performed on return from any exception taken during execution of this instruction. The behavior of the instruction is undefined if GPR base is one of the target registers since this may prevent a full restart of operations if an exception occurs.

LWM16—Load Word Multiple

The format of the LWM16 instruction is shown in FIG. 8A. In one embodiment, when executed by a microprocessor enabled to execute instructions from the ISA of the present invention, LWM16 loads a sequence of words starting from an effective address in microprocessor memory and stores them in selected GPRs. The effective address is formed by shifting the contents of the 4-bit Offset field left two bits, zero-extending the result to the GPR length, adding the zero-extended result to the contents of the SP, and performing any required virtual to physical address translation. An Address Error exception occurs if the effective address is not 32-bit aligned. The selected microprocessor target registers are determined by decoding the contents of the two-bit list field according to Table 560 in FIG. 5D. GPRs 16-19 listed in Table 560 are referred to in the O32 ABI as subroutine register variables; GPR 31 is RA. The register numbers and the effective addresses are correlated using the order listed in the table, starting with the left-most register on the list and ending with the right-most register on the list. The effective address is incremented for each subsequent register on the list. This instruction may execute for a variable number of cycles and may perform a variable number of loads from memory. A full restart of the sequence of operations will be performed on return from any exception taken during execution of this instruction.

SWM—Store Word Multiple

The format of the SWM instruction is shown in FIG. 8B. In one embodiment, when executed by a microprocessor enabled to execute instructions from the ISA of the present invention, SWM places the contents of a list of GPRs into a consecutive sequence of memory locations starting at an effective address. The list of GPRs is found by decoding the field reglist according to table 540 in FIG. 5C. Encodings not listed in the table are reserved. GPRs 16-23 listed in Table 540 are referred to in the O32 ABI as subroutine register variables; GPR 30 is referred to both as an eighth subroutine register and as a frame pointer; GPR 31 is RA. The effective address is formed by shifting the contents of the unsigned 12-bit immediate field left by bits, zero-extending the result to the GPR length, adding the zero-extended result to the contents of GPR base, and performing any required virtual to physical address translation. An Address Error exception occurs if the effective address is not 32-bit aligned, i.e. if the two least significant bits of the effective address are non-zero. The register numbers and the effective addresses are correlated using the order listed in the table, starting with the left-most register on the list and ending with the right-most register on the list. The first register in the list is placed in the effective address. The effective address is incremented for each subsequent register on the list. This instruction may execute for a variable number of cycles and may perform a variable number of stores to memory. A full restart of the sequence of operations will be performed on return from any exception taken during execution of this instruction.

SWM16—Store Word Multiple

The format of the SWM16 instruction is shown in FIG. 8A. In one embodiment, when executed by a microprocessor enabled to execute instructions from the ISA of the present invention, SWM 16 places the contents of a list of GPRs into consecutive memory locations starting at an effective address. The list of GPRs is determined by decoding the contents of the two-bit list field according to the Table 560 in FIG. 5D. GPRs 16-19 listed in Table 560 are referred to in the O32 ABI as subroutine register variables; GPR 31 is RA. The effective address is formed by shifting the contents of the unsigned 4-bit Immediate field left by two bits, zero extending the result to the GPR length, adding the zero-extended value to the contents of SP, and performing any required virtual to physical address translation. An Address Error exception occurs if the effective address is not 32-bit aligned. The register numbers and the effective addresses are correlated using the order listed in the table, starting with the left-most register on the list and ending with the right-most register on the list. The first register in the list is stored at the effective address. The effective address is incremented for each subsequent register on the list. This instruction may execute for a variable number of cycles and may perform a variable number of stores to memory. A full restart of the sequence of operations will be performed on return from any exception taken during execution of this instruction.

ANDI16—And Immediate

The format of the ANDI16 instruction is shown in FIG. 8A. In one embodiment, when executed by a microprocessor enabled to execute instructions from the ISA of the present invention, ANDI16 performs a bitwise logical AND of a constant with the value located in the GPR determined by decoding the contents of the 3-bit register field rs1 using Table 500 in FIG. 5A and stores the result in the GPR determined by decoding the contents of the 3-bit instruction field rd using Table 500 in FIG. 5S. The constant to be used in the logical AND operation is determined by decoding the Immediate value according to table 660 in FIG. 6E and zero-extending the result to the microprocessor register length.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, and so on. Such software can be disposed in any known computer usable medium including semiconductor, magnetic disk, or optical disk (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A method for operating a processor:
   setting a first bit to a first value if a code to be executed by the processor is compatible with a first encoding defined by a first set of instructions;
   setting the first bit to a second value if the code to be executed by the processor is compatible with a second encoding defined by a second set of instructions;
   executing the code in accordance with said first bit;
   setting a second bit to a first value to cause the processor to handle an exception/interrupt request in accordance with the first set of instructions, said second bit being different than said first bit;
   setting said second bit to a second value to cause the processor to handle an exception/interrupt request in accordance with said second set of instructions; and
   executing the code in accordance with said second bit,
   wherein said first set of instructions comprises a first subset of instructions having a first length and a second subset of instructions having a second length, and wherein said second set of instructions comprises a first subset of instructions having a third length and a second subset of instructions having a fourth length.

2. The method of claim 1 wherein said setting of the first bit is performed prior to powering the processor.

3. The method of claim 2 wherein said first bit is set by varying a position of a hardware switch.

4. The method of claim 1 wherein said first bit is set by varying the value of a register.

5. The method of claim 1 wherein said bit is stored in a coprocessor operating in coordination with the processor.

6. The method of claim 1 wherein said second bit is set by varying the position of a hardware switch.

7. The method of claim 1 wherein said second bit is set by varying the value of a register.

8. The method of claim 1 wherein said second bit is stored in a coprocessor operating in coordination with the processor.

9. The method of claim 1 wherein said first set of instructions comprises at least one instruction causing the processor to switch execution from the first encoding to the second encoding, and wherein said second set of instructions comprises at least one instruction causing the processor to switch execution from the second encoding to the first encoding.

10. The method of claim 1 wherein said first set of instructions comprises legacy instructions and said second set of instructions comprises variable length instructions.

11. A non-transitory computer readable storage medium comprising:
    a first plurality of instructions comprising instructions operative on privileged resources and encoded using a first instruction length and being selected by a first logic state of a first signal or being selected by a first logic state of a second signal;

a second plurality of instructions encoded using a second instruction length and being selected by a second logic state of a first signal or being selected by a second logic state of a second signal, and a third plurality of instructions encoded using a third instruction length, said third plurality of instructions being a subset of said first plurality of instructions;

wherein said first plurality of instructions have a six bit major opcode field and at least one other field, wherein a logical combination of three adjacent bits of said major opcode field determines which instructions are members of said second plurality, wherein said second plurality of instructions is a subset of said first plurality of instructions, and wherein the instruction length of said first and second pluralities is respectively 32 and 16 bits.

12. The non-transitory computer readable storage medium of claim 11 wherein the three adjacent bits are the three least significant bits (LSBs) of said major opcode field.

13. The non-transitory computer readable storage medium of claim 12 wherein the logical combination is (NOT LSB2) AND (LSB 1 OR LSB0).

14. The non-transitory computer readable storage medium of claim 11 wherein said second plurality of instructions is a subset of said first plurality of instructions.

15. The non-transitory computer readable storage medium of claim 11 wherein a determination is made to select said first plurality of instructions for execution, said determination being based on code execution speed.

16. The non-transitory computer readable storage medium of claim 11 wherein a determination is made to select said second plurality of instructions for execution, said determination being based on code size.

17. The non-transitory computer readable storage medium of claim 11 wherein said instruction length of said third plurality of instructions is 48 bits.

18. The non-transitory computer readable storage medium of claim 17 wherein a determination is made to select both said first and third pluralities of instructions for execution, said determination being based on code execution speed.

19. The non-transitory computer readable storage medium of claim 17 wherein a determination is made to select said first, second and third pluralities of instructions for execution, said determination being based on code size.

20. The non-transitory computer readable storage medium of claim 17 wherein said second plurality of instructions includes instructions having five-bit register fields that are decoded to select GPRs operative in the execution of said instructions.

21. The non-transitory computer readable storage medium of claim 20 wherein said second plurality of instructions includes instructions having three-bit register fields that are decoded to select GPRs operative in the execution of said instructions.

22. The non-transitory computer readable storage medium of claim 21 comprising instructions having a reglist field wherein said reglist field is decoded to select from a set of lists enumerating groups of GPRs, the list operative in the execution of said instructions.

23. The non-transitory computer readable storage medium of claim 22 comprising instructions having an Immediate field is decoded to determine offsets to be used in the execution of said instructions.

24. The non-transitory computer readable storage medium of claim 23 wherein the Immediate field is 4 bits.

25. The non-transitory computer readable storage medium of claim 24 wherein the Immediate field is 7 bits.

26. The non-transitory computer readable storage medium of claim 25 wherein the Immediate field is 9 bits.

27. The non-transitory computer readable storage medium of claim 26 comprising a Load Word Multiple instruction having a register field and an immediate field that are combined to determine addresses of microprocessor memory from which words may be loaded into said group of GPRs.

28. The non-transitory computer readable storage medium of claim 27 comprising a Store Word Multiple instruction having a register field and an immediate field that are combined to determine addresses of microprocessor memory into which the contents of said group of GPRs may be placed.

29. The non-transitory computer readable storage medium of claim 28 wherein said second plurality of instructions includes an ANDI16 instruction having an immediate field holding a number that may be decoded to select an immediate value from a list of immediate values.

30. The non-transitory computer readable storage medium of claim 29 wherein the second plurality of instructions includes a JRADDIUSP instruction having an immediate field that may determine an immediate value and implicitly uses SP and RA.

31. The non-transitory computer readable storage medium of claim 30 wherein the execution of the JRADDIUSP instruction may cause an unconditional branch to the address held in RA while also arithmetically combining said immediate value with the contents of SP to produce a new value for the contents of SP.

32. A computer system adapted to execute a code, said computer system comprising:

a memory adapted to store an instruction set including a first plurality of instructions comprising instructions operative on privileged resources and encoded using a first instruction length, a second plurality of instructions encoded using a second instruction length, and a third plurality of instructions encoded using a third instruction length, said third plurality of instructions being a subset of said first plurality of instructions;

a processor adapted to execute a first group of codes of a computer program using said first plurality of instructions, to execute a second group of codes of said computer program using the second plurality of instructions, and to execute a third group of codes of said computer program using the third plurality of instructions;

a first register bit having a first logic state and a second logic state, said first logic state of said first register bit being adapted to select said first plurality of instructions, and said second logic state of said first register bit being adapted to select said second plurality of instructions; and a second register bit having a first logic state and a second logic state, said first logic state of said second register bit being adapted to select said first plurality of instructions, and said second logic state of said second register bit being adapted to select said second plurality of instructions, wherein the instructions of said instruction set have a six bit major opcode field and at least one other field, wherein a logical combination of the three adjacent bits of said major opcode field determine which instructions of said instruction set are members of said second plurality, wherein said second plurality of instructions is a subset of said first plurality of instructions, and wherein said instruction length of said first and second pluralities of instructions is respectively 32 and 16 bits.

33. The computer system of claim 32 wherein the three adjacent bits are the three Least Significant Bits (LSBs) of said major opcode field.

34. The computer system of claim 33 wherein the logical combination is (NOT LSB2) AND (LSB1 OR LSB0).

35. The computer system of claim 32 wherein a determination is made to execute said first group of codes, said determination based on code execution speed.

36. The computer system of claim 32 wherein a determination is made to execute both said first group of codes and said second group of codes, said determination based on code size.

37. The computer system of claim 32 wherein said instruction length of said third plurality of instructions is 48 bits.

38. The computer system of claim 37 wherein a determination is made to execute both said first and third pluralities of instructions, said determination based on code execution speed.

39. The computer system of claim 37 wherein a determination is made to execute said first, second and third pluralities of instructions, said determination based on code size.

40. The computer system of claim 37 wherein said second plurality of instructions includes instructions having five-bit register fields that are decoded to select GPRs operative in the execution of said instructions.

41. The computer system of claim 40 wherein said second plurality of instructions includes instructions having three-bit register fields that are decoded to select GPRs operative in the execution of said instructions.

42. The computer system of claim 40 comprising instructions having a reglist field wherein said reglist field is decoded to select from a set of lists enumerating groups of GPRs, the list operative in the execution of said instructions.

43. The computer system of claim 42 comprising instructions having an Immediate field wherein the Immediate field is decoded to determine offsets to be used in the execution of said instructions.

44. The computer system of claim 43 wherein the Immediate field is 4 bits.

45. The computer system of claim 44 wherein the Immediate field is 7 bits.

46. The computer system of claim 44 wherein the Immediate field is 9 bits.

47. The computer system of claim 46 wherein the first and second plurality of instructions includes a Load Word Multiple instruction having a register field and an immediate field that may be combined to determine addresses of processor memory from which words may be loaded in to said group of GPRs.

48. The computer system of claim 47 wherein the first and second plurality of instructions include a Store Word Multiple instruction having a register field and an immediate field that may be combined to determine addresses of processor memory into which the contents of said group of GPRs may be placed.

49. The computer system of claim 48 wherein said second plurality of instructions includes an ANDI16 instruction having an immediate field holding a number that may be decoded to select an immediate value from a list of immediate values.

50. The computer system of claim 49 wherein the second plurality instructions includes a JRADDIUSP instruction having an immediate field that may determine an immediate value and implicitly uses SP and RA.

51. The computer system of claim 50 whose execution may cause an unconditional branch to the address held in RA while also arithmetically combining said immediate value with the contents of SP to produce a new value for the contents of SP.

52. A non-transitory computer readable storage medium including instructions to be executed by logic blocks of a processor, the non-transitory computer readable storage medium adapted for use by an electronic design automation application executed by a computer, wherein the logic blocks are configured to cause a memory to selectively:
 store a first plurality of instructions comprising instructions operative on privileged resources and encoded using a first instruction length and being selected by a first logic state of a first signal or being selected by a first logic state of a second signal;
 store a second plurality of instructions encoded using a second instruction length and being selected by a second logic state of a first signal or being selected by a second logic state of a second signal, said second plurality of instructions being a subset of said first plurality of instructions, and
 store a third plurality of instructions encoded using a third instruction length, said third plurality of instructions being a subset of said first plurality of instructions,
 wherein said instructions to be executed have a six bit major opcode field and at least one other field, wherein a logical combination of three adjacent bits of said major opcode field determines which instructions of said instruction set are members of said second plurality, wherein said length of said first and second pluralities of instructions is respectively 32 and 16 bits.

53. The non-transitory computer readable storage medium of claim 52 wherein the three adjacent bits are the three Least Significant Bits (LSBs) of said major opcode field.

54. The non-transitory computer readable storage medium of claim 53 wherein the logical combination is (NOT LSB2) AND (LSB1 OR LSB0).

55. The non-transitory computer readable storage medium of claim 52 wherein said length of said third plurality of instructions is 48 bits.

56. The non-transitory computer readable storage medium of claim 55 wherein said second plurality of instructions includes instructions having five-bit register fields that are decoded to select GPRs operative in the execution of said instructions.

57. The non-transitory computer readable storage medium of claim 56 wherein said second plurality of instructions includes instructions having three-bit register fields that are decoded to select GPRs operative in the execution of said instructions.

58. The non-transitory computer readable storage medium of claim 57 wherein said second plurality of instructions includes instructions having a reglist field wherein said reglist field is decoded to select from a set of lists enumerating groups of GPRs, the list operative in the execution of said instructions.

59. The non-transitory computer readable storage medium of claim 58 wherein said second plurality of instructions includes instructions having an Immediate field wherein the immediate field is decoded to determine offsets to be used in the execution of said instructions.

60. The non-transitory computer readable storage medium of claim 59 wherein the Immediate field is 4 bits.

61. The non-transitory computer readable storage medium of claim 60 wherein the Immediate field is 7 bits.

62. The non-transitory computer readable storage medium of claim 61 wherein the Immediate field is 9 bits.

63. The non-transitory computer readable storage medium of claim 62 wherein the first and second plurality of instructions includes a Load Word Multiple instruction having a register field and an immediate field that may be combined to determine addresses of processor memory from which words may be loaded in to said group of GPRs.

64. The non-transitory computer readable storage medium of claim 63 wherein said first and second plurality of instructions includes a Store Word Multiple instruction having a register field and an immediate field that may be combined to determine addresses of processor memory into which the contents of said group of GPRs may be placed.

65. The non-transitory computer readable storage medium of claim 64 wherein said second plurality of instructions includes an ANDI16 instruction having an immediate field holding a number that may be decoded to select an immediate value from a list of immediate values.

66. The non-transitory computer readable storage medium of claim 65 wherein the second plurality instructions includes a JRADDIUSP instruction having an immediate field that may determine an immediate value and implicitly uses SP and RA.

67. The non-transitory computer readable storage medium of claim 66 wherein the execution of said JRADDIUSP instruction may cause an unconditional branch to the address held in RA while also arithmetically combining said immediate value with the contents of SP to produce a new value for the contents of SP.

68. The method of claim 1 wherein the first subset of the first set of instructions are defined by a compact encoding length, and the second subset of the first set of instructions are defined by a normal encoding length greater than the compact encoding length.

69. The method of claim 1 wherein the first subset of the second set of instructions are defined by the normal encoding length, and the second subset of the second set of instructions are defined by an extended encoding length greater than the normal encoding length.

70. The method of claim 1 wherein the compact encoding length is 16, the normal encoding length is 32, and the extended encoding length is 48.

* * * * *